United States Patent

Ishida

[11] Patent Number: 5,884,426
[45] Date of Patent: Mar. 23, 1999

[54] MAGNETIC DEVICE FOR REPELLING BIRDS

[76] Inventor: Takashi Ishida, 1-24-1 Morigaoka, Isogo-ku, Yokohama-shi, Kanagawa-Ken, Japan

[21] Appl. No.: 905,459

[22] Filed: Aug. 4, 1997

[30] Foreign Application Priority Data

Aug. 8, 1996 [JP] Japan ................................. 8-208703

[51] Int. Cl.⁶ .............................. A01M 29/00; E04B 1/72
[52] U.S. Cl. .............................. 43/1; 52/101; 116/22 A
[58] Field of Search .................... 43/1, 98, 112, 43/131; 52/101; 116/22 A; 361/232

[56] References Cited

U.S. PATENT DOCUMENTS

| | | | |
|---|---|---|---|
| 2,777,171 | 1/1957 | Burnside et al. | 52/101 |
| 3,282,000 | 11/1966 | Shaw et al. | 52/101 |
| 5,058,335 | 10/1991 | Richter | 52/101 |
| 5,253,444 | 10/1993 | Donoho et al. | 43/1 |
| 5,353,543 | 10/1994 | Teraoka | 43/124 |
| 5,400,552 | 3/1995 | Negre | 52/101 |
| 5,433,029 | 7/1995 | Donoho et al. | 43/1 |
| 5,648,641 | 7/1997 | Guthrie | 174/139 |
| 5,649,394 | 7/1997 | Ohba | 52/101 |
| 5,666,767 | 9/1997 | Ohba | 52/101 |

FOREIGN PATENT DOCUMENTS

| | | | |
|---|---|---|---|
| 2693080 | 1/1994 | France | 52/101 |
| 3501333 | 7/1986 | Germany | 116/22 A |
| 4300154 | 7/1994 | Germany | 52/101 |
| 2260252 | 4/1993 | United Kingdom | 52/101 |
| WO 93/07744 | 4/1993 | WIPO | 52/101 |

OTHER PUBLICATIONS

Henry Gee—Why Do Birds Fly South? Nature Science Update Oct. 17, 1996 Chris Mead—Bird Migration—Facts on File Publications.

*Primary Examiner*—Michael J. Carone
*Assistant Examiner*—Darren Ark
*Attorney, Agent, or Firm*—Edward A. Sokolski

[57] ABSTRACT

One or more support rods made of a non-magnetic material have magnets mounted thereon, the magnets being placed with their north-south pole axes perpendicular to the longitudinal axes of the rods and with the north-south axes of magnets of adjacent rods normal to each other. The bottom end of the rod or rod assembly is connected through a flexible sleeve, which may be of rubber, to a support. The sleeve acts as a universal joint permitting freedom of movement of the rod and magnet assembly sideways. The rod swings back and forth sideways in response to the wind and other forces thereby creating a variable magnetic field which tends to repel birds, keeping them from flying into the immediate area and/or nesting in such area.

14 Claims, 10 Drawing Sheets

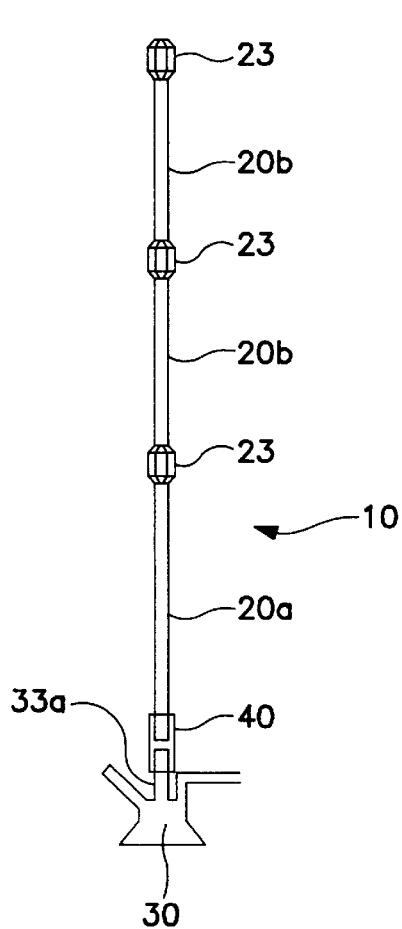
FIG. 1
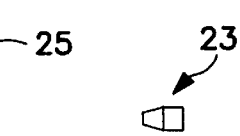
FIG. 2C
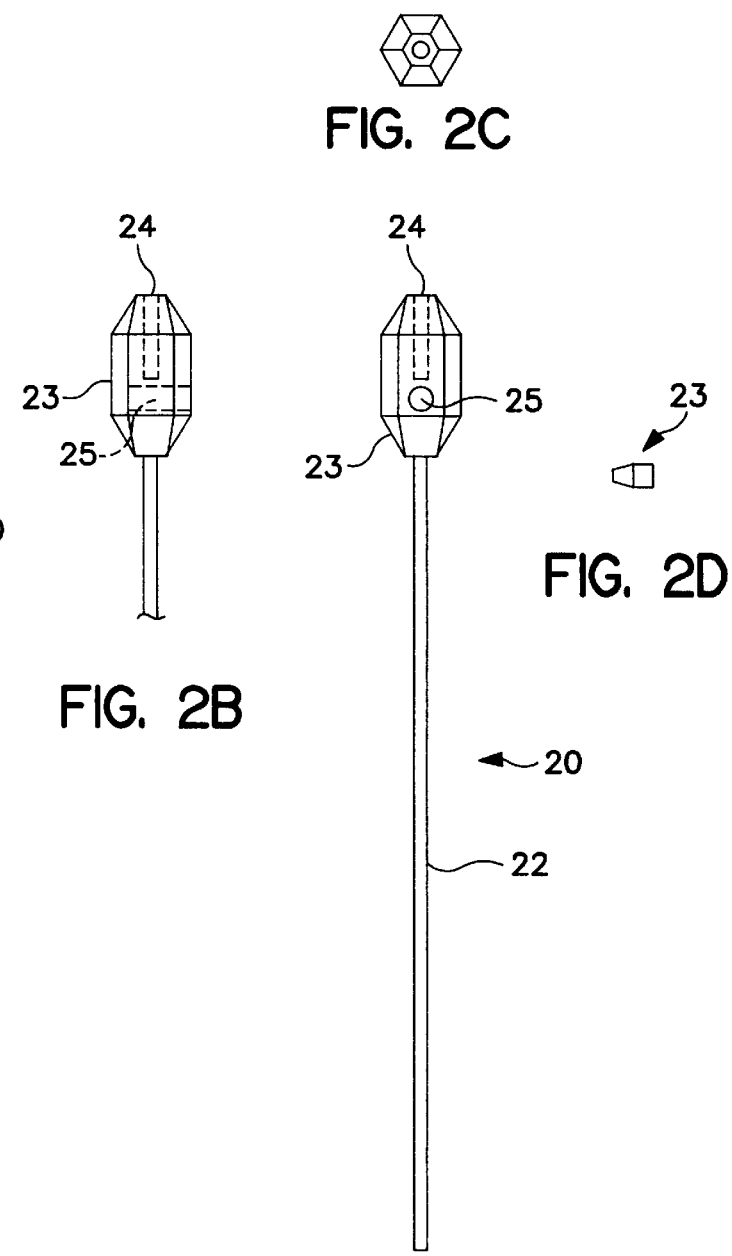
FIG. 2B
FIG. 2D
FIG. 2A

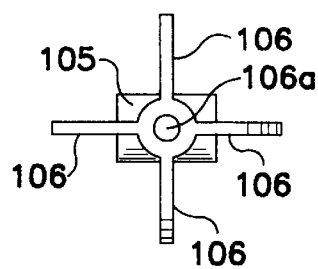 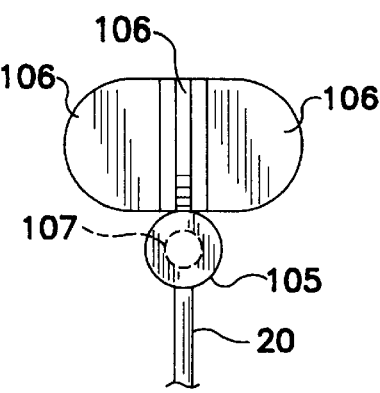 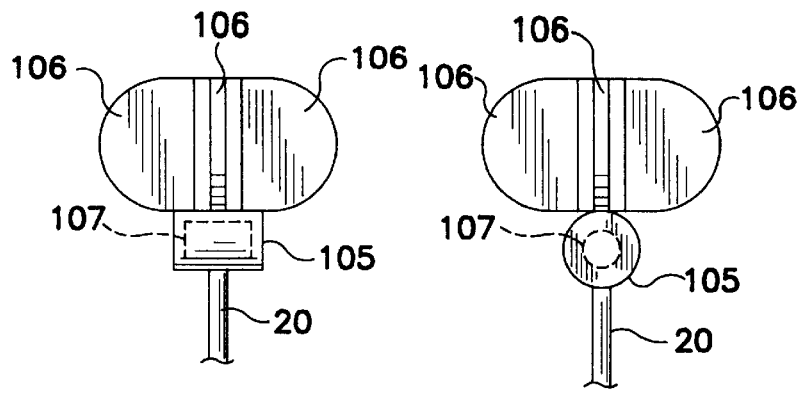
FIG. 16A   FIG. 16B   FIG. 16C
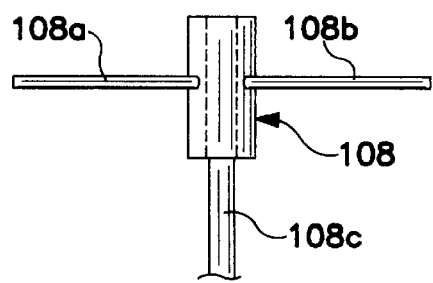 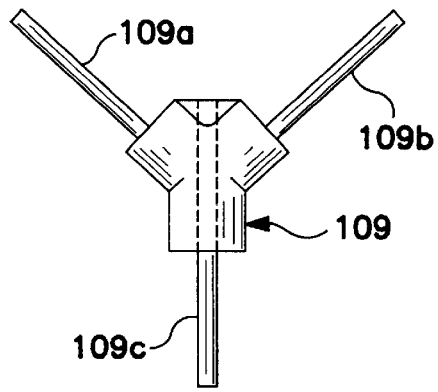
FIG. 17   FIG. 18
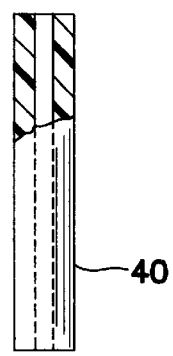
FIG. 15

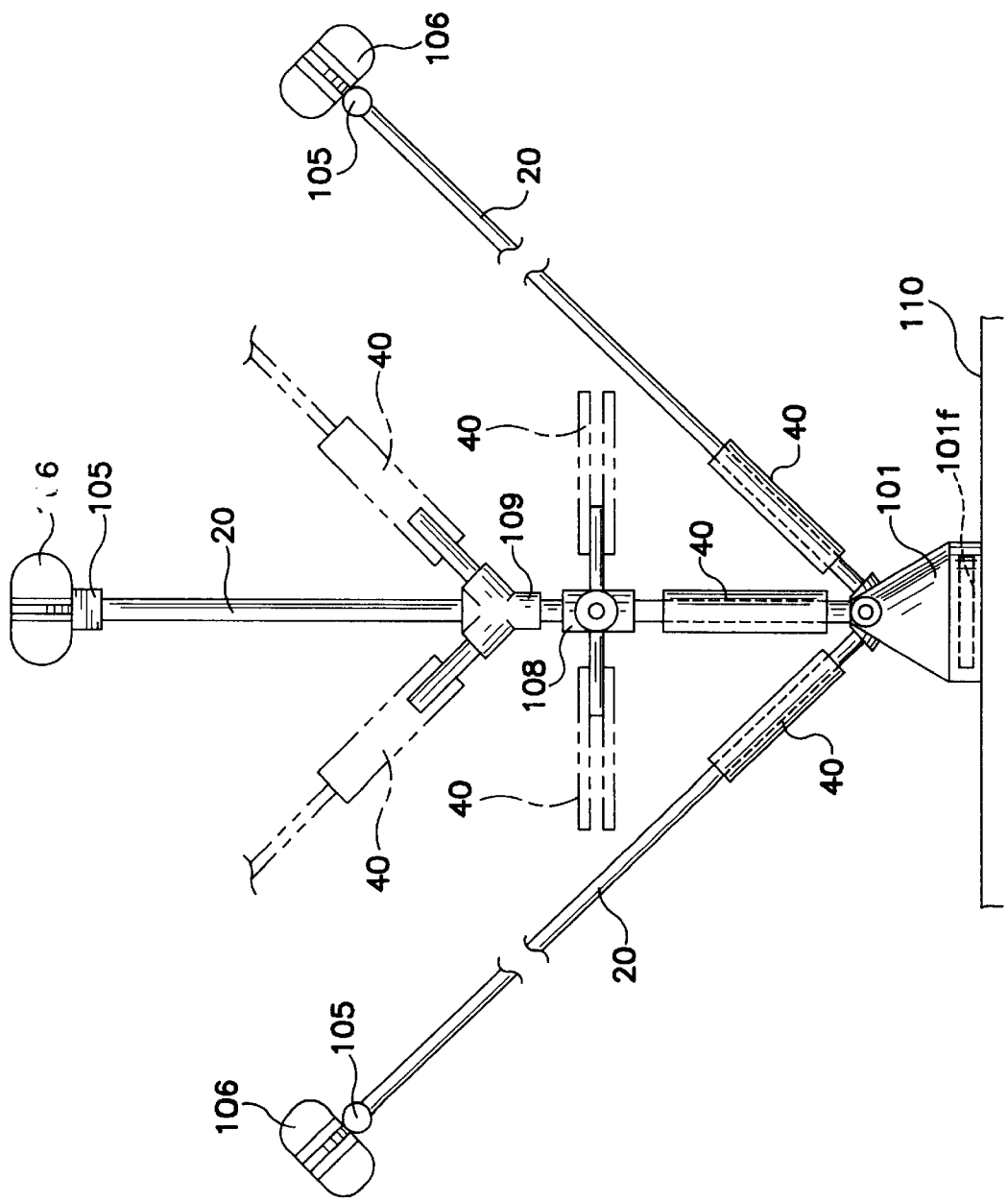

MAGNETIC DEVICE FOR REPELLING BIRDS

BACKGROUND OF THE INVENTION

1. Field of the Invention

This invention relates to a device for repelling birds and more particularly to such a device which employs a rod having a permanent magnet assembly mounted thereon which is mounted for freedom of sideways motion universally in any direction in response to the wind thereby generating a varying magnetic field.

2. Description of the Related Art

Birds such as crows, sparrows, pigeons, thrushes and the like can be troublesome in scavenging rubbish, pecking at crops on farms and dropping feces. Conventional techniques for repelling birds include the generation of loud sounds, the use of signs with large eyes,etc. It has been found that birds sense terrestrial magnetic fields and use such fields in locating their position. This is described, for example on pages 130–134 of Bird Migration by Chris Mead published by Facts on File, Inc. in 1983. When they detect magnetic fields different from and stronger than terrestrial fields, they tend to become fearful and disoriented and take aversive action. Thus, birds tend not to approach any area where there is a magnetic field stronger than the terrestrial magnetic field.

Taking advantage of the above factors, various devices have been developed in the prior art which generate magnetic fields to repel birds. Such devices are described in Japanese Official Gazette, laid open patent no. Heisei-8-986612 and laid open patent no. 8-38022 and U.S. Pat. No. 5,353,543 issued Oct. 11, 1994 to K. Teraoka.

In these disclosures, devices are described which utilize miniature windmills which have magnets mounted on their rotatable vanes. Thus, variable magnetic fields are generated with the rotation of the windmill vanes to produce the desired end effect. Also described in one of these disclosures is a device employing a plurality of spherical magnets which are hung along a line across the entrance of a space to be protected. Such prior art devices have the disadvantage of occupying more space than to be desired. Further the construction, particularly of the windmill devices tends to be rather expensive. It is also to be noted that birds often fly into and nest within the structural beams of an iron tower which supports power lines where the power lines and the structure of the tower make it difficult to mount the types of devices of the prior art. If the magnetic repelling device is mounted outside of the tower structure and interlacing wires, the magnetic field generated thereby may not reach within the structure. Further, the steel structure of the towers tends to absorb the magnetic energy such that the effective range of the magnetic repelling device is limited.

Thus, with devices of the prior art, it is difficult to prevent birds from flying into and nesting in spaces confined between the structure of towers and the like. It is further to be noted that most such prior art devices have a fixed structure which cannot readily be adapted in size and shape for mounting in various different locations.

BRIEF SUMMARY OF THE INVENTION

The magnetic device for repelling bird of the present invention is a significant improvement over the prior art in providing a device which can be adapted for installation in various confined locations close to the area to be protected. This end result is achieved in a device of economic constructions.

The device of the present invention employs one or more support rod sections of a non-magnetic material. The effective support rod length can be increased as desired by interconnecting two or more rod sections together with connectors. The support rods are mounted on a base member by means of a resilient sleeve of an insulating material, such that the rod assembly is free to rock back and forth in the wind or by a bird which may strike against one of the rods. One or more magnets is mounted on the rod assembly, preferably at or near a distal end thereof so that such magnet experiences substantial rocking motion with motion of the rod assembly.

The magnets are placed in an assembly and aligned so that the axes running between the N–S poles of adjacent magnets are perpendicular to each other. This provides for magnetic fields in various directions and increases the effective magnetic range of the device. Also the mounting of the magnets in this fashion tends to decrease interference between flux lines generated by adjacent magnets.

When the support rod assembly is rocked in the wind or by other forces, a fluctuating magnetic field is generated which effectively causes birds to lose their sense of direction thereby tending to repel them and prevent them from entering or nesting in a space to be protected.

It is therefore an object of the invention to provide an improved magnetic device for repelling birds which is compact and can be adapted for mounting in various locations.

It is a further object of the invention to facilitate the repelling of birds from confined areas.

It is a still further object of this invention to increase the effective range of magnetic bird repelling devices.

Other objects of the invention will become apparent in connection with the following description in conjunction with the accompanying drawings.

BRIEF DESCRIPTION OF THE DRAWINGS

FIG. 1 is a front elevational view of a support structure for a first embodiment of the invention;

FIG. 2A is a front elevational view of the rod and connector member of the first embodiment;

FIG. 2B is a side elevational view of the connector member of the first embodiment;

FIG. 2C is a top plan view of the connector member of the first embodiment;

FIG. 2D is a side elevational view of the lid member of the first embodiment;

FIG. 12 and FIGS. 12a–12f are schematic illustrations showing the installation of devices of the invention on an electric pole;

FIG. 15 is an elevational view of an elastic sleeve which may be employed in joining a rod to the base unit;

FIGS. 16A–16C are a series of illustrations of the top portion of the second embodiment;

FIG. 17 is an elevational view of a connector unit which may be employed for joining the rods to the base unit or to each other;

FIG. 18 is an elevational view of a second connector unit which may be employed for joining the rods to the base unit to each other; and FIG. 19 is an elevational view illustrating one way in which the device of the second embodiment may be assembled.

DETAILED DESCRIPTION OF THE INVENTION

Figure 3C:
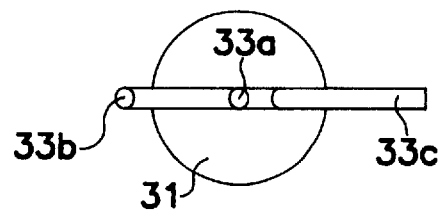
FIG. 3C is a top plan view of the base member of the first embodiment.
Figure 3B:
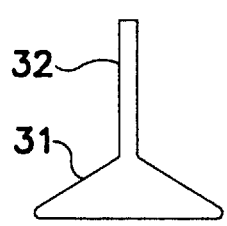
FIG. 3B is a side elevational view of the base member of the first embodiment.
Figure 3A:
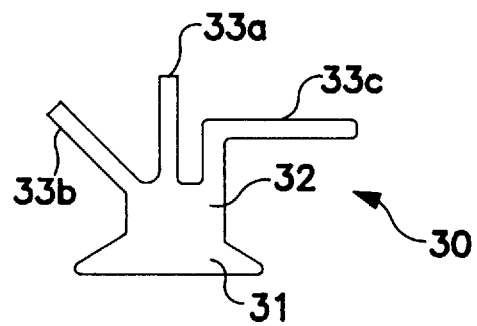
FIG. 3A is a front elevational view of the base member of the first embodiment.
Figure 3D:
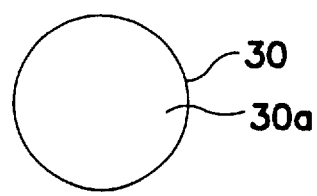
FIG. 3D is a bottom view of the base member of the first embodiment.
Figure 4:
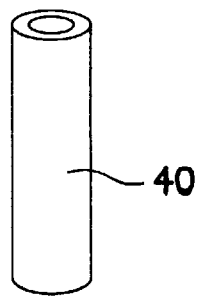
FIG. 4 is a perspective view of the resilient connector sleeve of the first embodiment.

Referring now to FIGS. 1–4, a first embodiment of the invention is illustrated. A base member 30 is used to mount support rod 20 onto a mounting site. Base 30 has a discoidal portion 31 and a supporting portion 32 which has a plurality of supporting arms 33a–33c which extend therefrom at various different angles, arm 33a extending perpendicularly, arm 33b extending at an oblique angle, and arm 33c extending parallel to the bottom portion 30a of the base. A magnet 30a is provided on the bottom of the base to enable attachment to a steel or iron structure. In the alternative, the base may be attached to a support structure by means of double sided bonding tape.

Typically, the bottom surface 30a of base member 30 has a diameter of about 40 mm with the base having a height of about 45 mm. The length of each of arms 33a–33c is about 25 mm, these arms having a diameter of 4 mm. All of the elements of the device are fabricated of a suitable weather resistant non magnetic material such as a suitable resin.

Rod assembly 10 may, as shown in FIG. 1 consist of a plurality of rod elements 20a and 20b connected together by connectors 23. Typically the rod elements have a diameter of about 4 mm and may have lengths of either about 205 mm or 125 mm. The bottom rod element 20a is connected to the arm 33a of the base member by means of resilient rubber sleeve 40. This sleeve may also be fabricated of another elastic material such as weather proof synthetic rubber, silicone rubber or a resin coil. Typically sleeve 40 has a diameter slightly less than 4 mm so that the rod will fit snugly therein and a length of about 50 mm. It is important that sleeve 40 and the rod and rod assembly have sufficient resiliency so that the rod or rod assembly will rock back in forth when activated by the wind or other ambient disturbance. Permanent magnets are installed in each of the connectors 23 with the longitudinal axes of the magnets in the two lower connectors being oriented parallel to bottom surface of base 30 and with the longitudinal axis of the magnet in the top connector being oriented normal to this surface. By utilizing a plurality of support rods with magnets installed in each of the connectors 23, as shown in FIG. 1, it is possible to place the magnets at various distances from the mounting surface to more effectively operate with birds of different sizes.

Referring now particularly to FIGS. 2A–2D, the components of one embodiment of the invention are shown. Support rod 20 consists of a columnar pole member 22. Connecting member 23 is attached to the top end of the pole member. The central portion of connecting member 23 forms a hexagonal column about 20 mm in length with the upper and lower portions of member 23 forming hexagonal cones about 10 mm in length facing upwardly and downwardly respectively. The outer diameter of the central section is about 20 mm.

Connecting member 23 has a longitudinal chamber 24 formed therein which runs from the top to the center thereof which has a diameter of about 4 mm so that it can snugly receive another rod member. Adhesive can be used to join the rods to the connectors or the rods and apertures on the connectors can be threaded to enable threadable engagement there between. A transverse compartment 25 is formed in connector 23 in which a permanent magnet can be installed with the axis between the N-S poles thereof being normal to the longitudinal axis of the rod. If so desired a magnet may be installed in the longitudinal chamber 24 of the uppermost connector in which case no magnet is installed in compartment 25 to avoid interaction between magnets, and the compartment is closed off by means of a plug 21.

It is to be noted that a variety of different arrangements for support arms 33a–33c can be employed to provide a variety of different angular orientations for the rods 20, this to accommodate to different sites and different requirements.

Figure 5A:
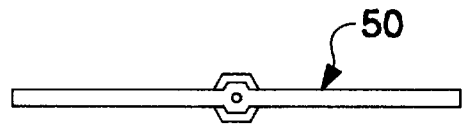
FIGS. 5A–5C are a series of illustrations showing how the connecting member changes direction in the device of the invention.
Figure 5B:
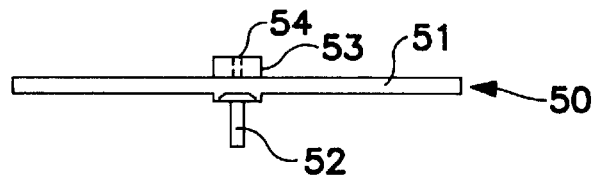
Figure 5C:
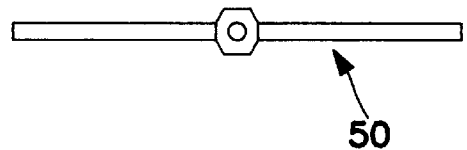

Referring to FIGS. 5A–5C, a form of connecting member 50 adapted to enable a change in the direction of the rod is illustrated. This connecting member is generally T-shaped and has a horizontal arm 51 which has a block shaped piece 53 at the center thereof. An aperture 54 having a diameter of about 4 mm is formed in the center of piece 53. A support rod 20 connected to base 30 either directly or through an intermediate rod is installed in aperture 54. Arm 51 can be attached to another rod mounting a magnet assembly by means of a connector. The directional orientation of the support rods can thus be changed as may be desired. The shape of the connecting member 50 may be made "Y" shaped or in other shapes to extend the rods in various manners.

Figure 6:
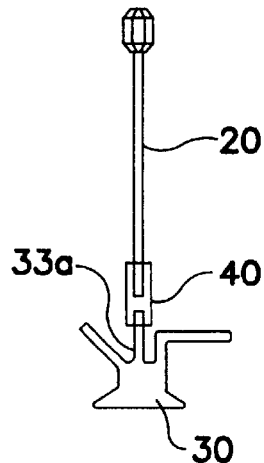
FIG. 6 is a front elevational view showing a first form of installation of the first embodiment.
Figure 7:
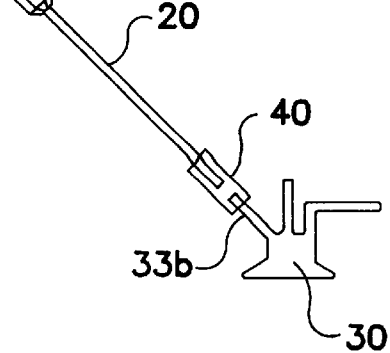
FIG. 7 is a front elevational view showing a second form of installation of the first embodiment.
Figure 8:
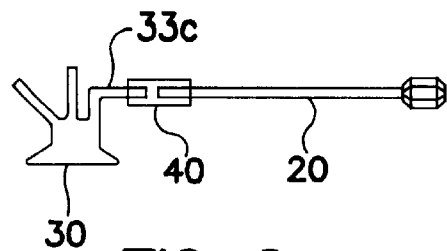
FIG. 8 is a front elevational view showing a third form of installation of the first embodiment.

Referring now to FIGS. 6–8, the mounting of a rod 20 on base 30 for each of the three available orientations is illustrated relationship. Thus, a number of different support axes for the rods are provided thereby allowing for a variety of different rod orientations and accommodating a variety of different mounting sites which might provide either vertical horizontal or angular mounting.

It is to be noted that when a bird flies near a support rod and spreads its wings pushing against the support rod, the support rod will tilt and when the bird closes its wings freeing the support rod, the rod will rock back and forth on its support sleeve creating the sought after varying magnetic field which is both unpleasant and uncomfortable to the bird.

Figure 9:
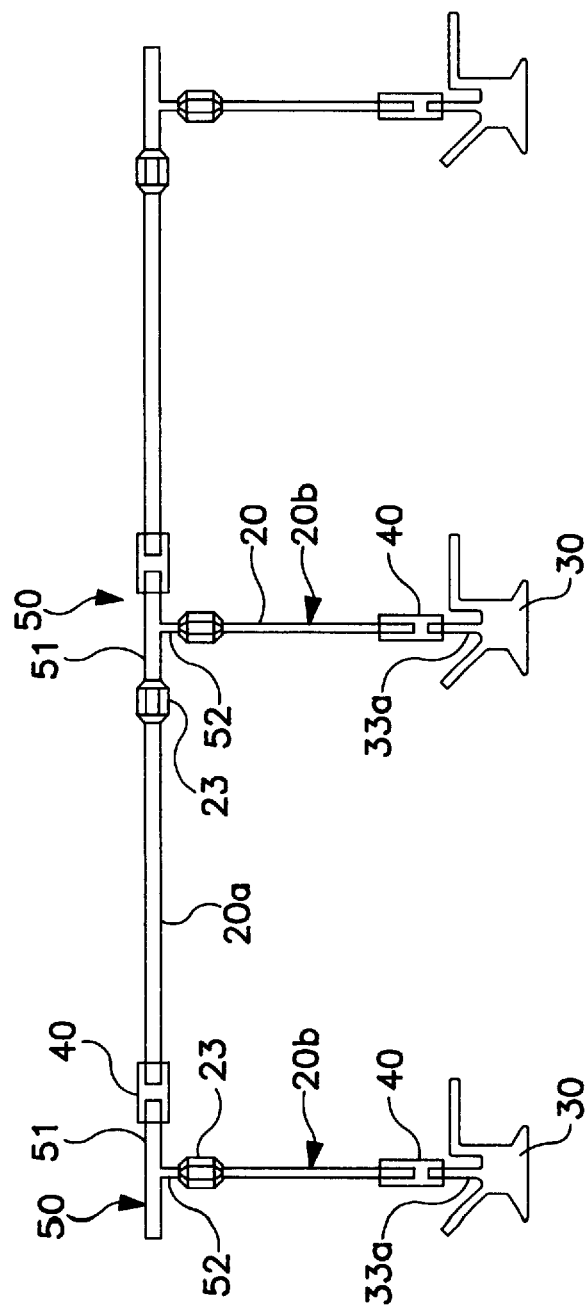
FIG. 9 is a front elevational view illustrating a fourth form of installation of the first embodiment.

Referring now to FIG. 9 a configuration is shown which is created by connecting a number of the units of the invention together. In this configuration a small support rod 20b is connected to the arms 33a of each of three base units 30 through a resilient sleeve 40. A connecting member 50, as described in FIGS. 5A–5C, is connected by means of its arm 52 to the top connector member 23 of each unit. The horizontal arms 51 are interconnected by means of sleeves 40 and connectors 23. It is possible by this structure to mount the support rods 20a at a predetermined distance from the bases 30. This structure enables the mounting of the rods on a variety of support structures in a manner which provides effective range both horizontally and vertically. This structure also provides a more secure mount on the mounting site. It can be appreciated that the structure formed from the elements of the device of the invention shown in FIG. 9 is illustrative of only one of many configurations different configurations that can be formed to meet various requirements.

Figure 10:
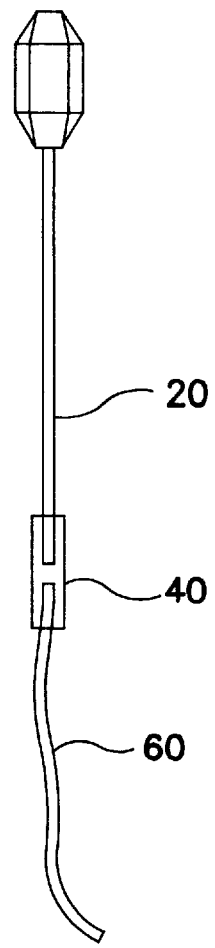
FIG. 10 is a front elevational view illustrating the use of wire in the installation of the device of the invention.

Referring now to FIG. 10, a further embodiment of the invention is illustrated. In this embodiment, a flexible insulated wire 60 is connected to rod 20 by means of resilient sleeve 40. The rod can be mounted on a suitable support such as an electrical wire or pipe by winding the wire 60 around such support. This enables the mounting of the rod in locations where the base member 30 cannot be mounted.

Figure 11:
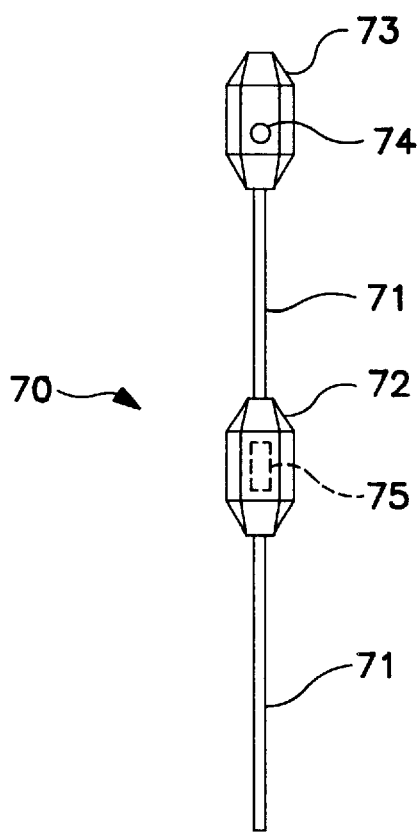
FIG. 11 is a front elevational view illustrating a form of the invention employing a plurality of magnet assemblies.

Referring now to FIG. 11, a further form of the invention is illustrated. In this embodiment a support rod structure 70 utilizes two magnets. A pair of similar pole sections 71 are connected to the opposite ends of connector member 72. A magnet 75 is installed in a compartment formed in connector 72, this magnet being oriented with its longitudinal axis normal to the longitudinal axes of rods 71. Similarly a magnet 74 is installed in a compartment formed in connector 73. The magnet installed in connector 73 is oriented at right angles to the magnet in connector 72 to avoid interference between the two magnets.

Figure 12C:
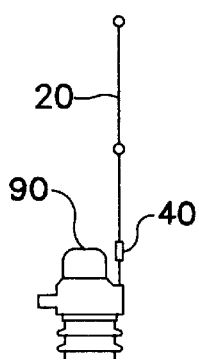
Figure 12A:
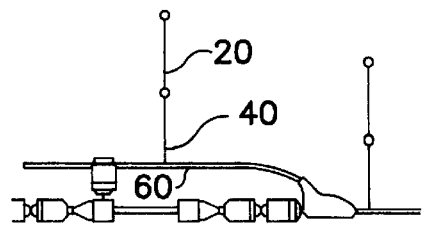
Figure 12:
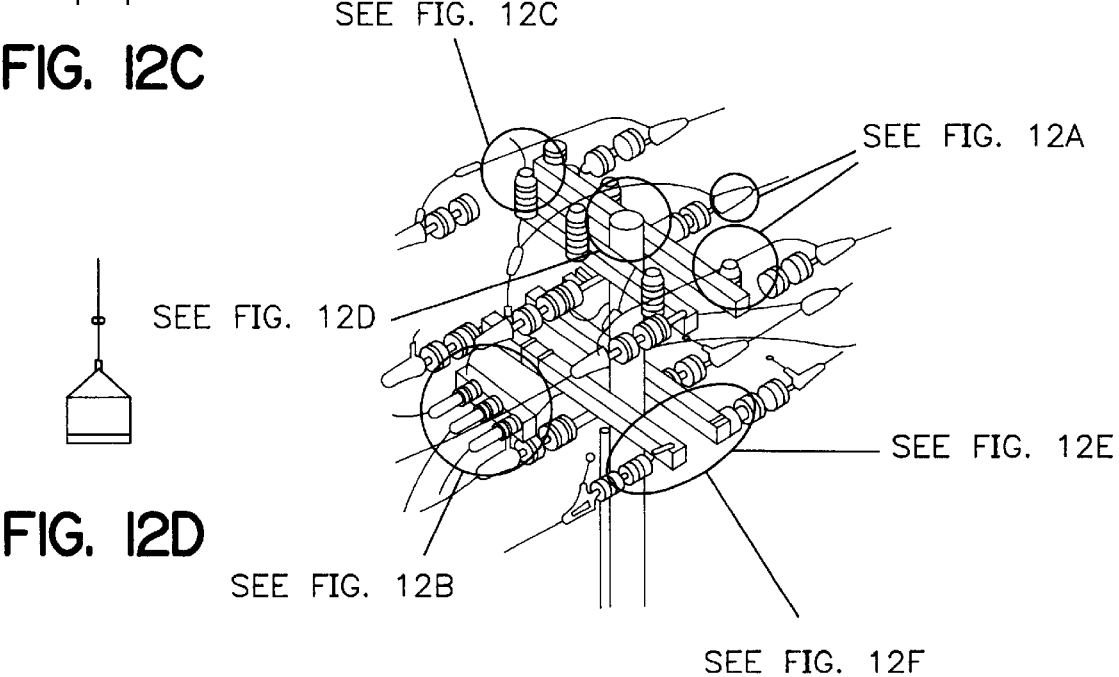
Figure 12B:
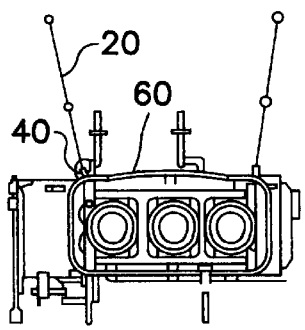
Figure 12E:
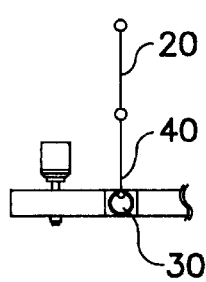
Figure 12F:
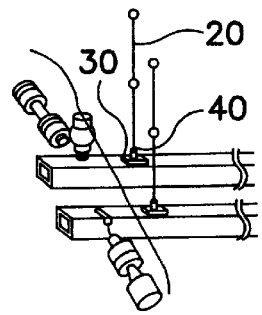

Referring now to FIG. 12, various arrangements for mounting the device of the invention on a power pole are illustrated. As shown, when mounting the device of the invention, as shown at (a) and (b), where there are linked wire line sections or other non-magnetic structure, a wire 60 can be wound around the support structure. As shown in (c), the rod assembly is mounted in a resin cap 90 attached to the top of a glass insulator. As shown in (d), the rod assembly is mounted on the top of a power pole. Where the power poles are of steel, the device can be mounted as shown in (e) and (f) by utilizing the base having a magnetic bottom piece, as previously described.

Figure 13:
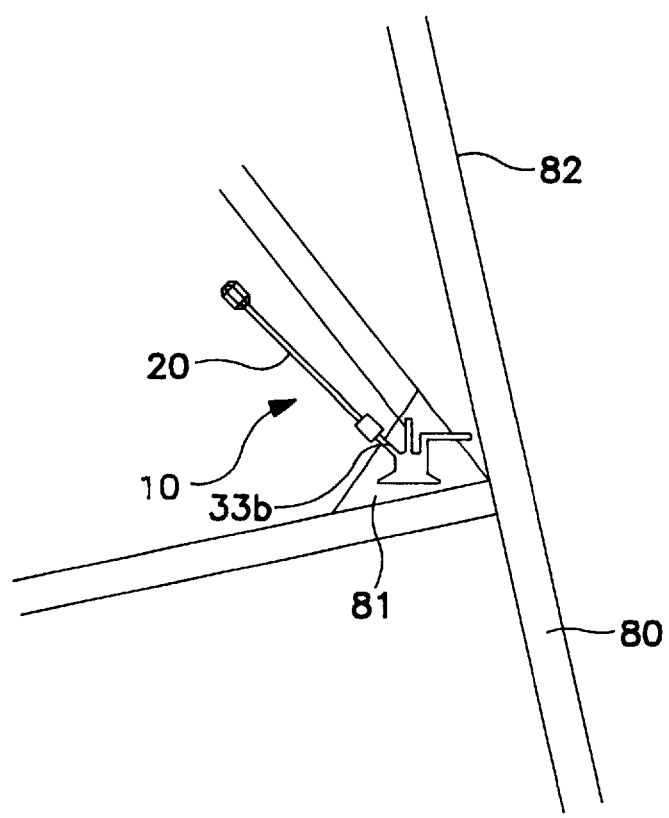
FIG. 13 is a schematic illustration showing the installation of the device of the invention on a steel tower.
Figure 14D:
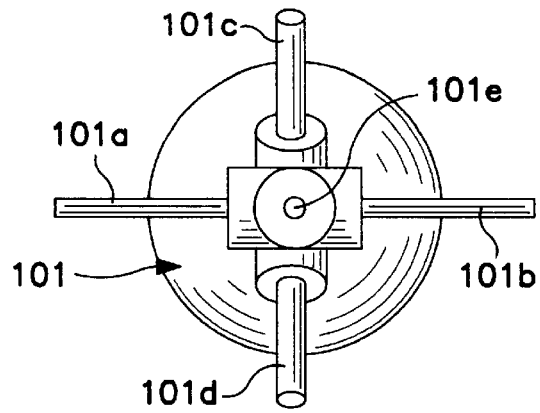
FIGS. 14A–14D are a series of illustrations of a second embodiment of the base unit of the invention.
Figure 14C:
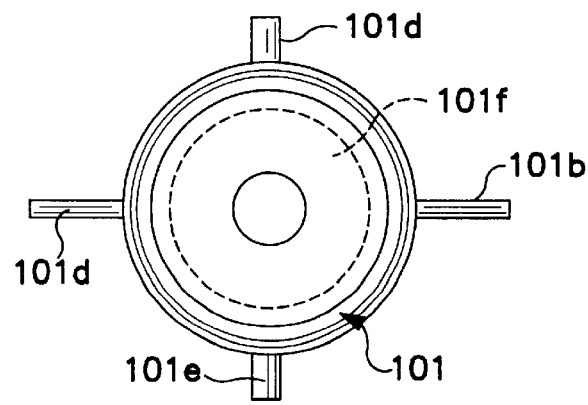
Figure 14A:
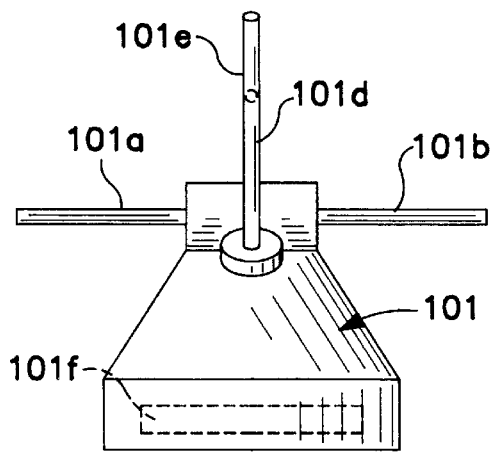
Figure 14B:
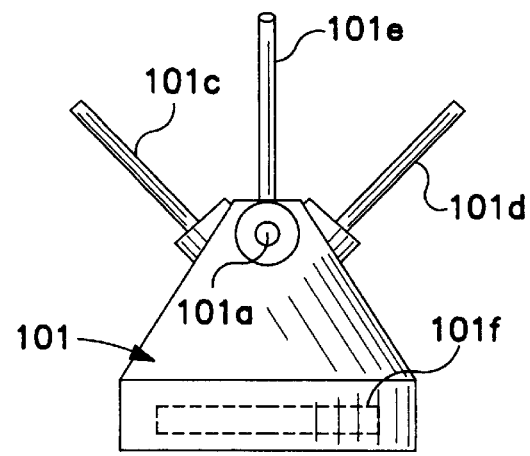

Referring to FIG. 13, the device of the invention is shown mounted on a steel power line tower 80. To minimize magnetic interference from the steel structure, the unit 10 is mounted on a steel junction plate 81 with the rod 20 extending in an oblique direction to the steel beams 82.

Referring now to FIGS. 14A–14D, the base unit of a second embodiment of the invention is illustrated. Base 101 is conical in shape and has a plurality of arms 101a–101e extending therefrom in a variety of different directions as can be seen in the illustrations. A magnet 101f is installed on the bottom of the base for use in retaining the base on a steel or iron support structure such as a steel plate 110, as shown in FIG. 19. As for the previous embodiment, the base is fabricated from a non-magnetic plastic material.

FIG. 15 illustrates the resilient sleeve 40 which is employed which may be the same as that of the first embodiment.

Referring now to FIGS. 16a–16c, the top portion of the second embodiment is illustrated. This top portion is fixedly attached to a rod section 20 and includes a compartment 105 in which a magnet 107 is mounted. Above the magnet there is a vane structure 106 having vanes at right angles to each other. An aperture is formed in the top of the vane structure to receive an additional rod and magnet unit, if so desired.

FIGS. 17 and 18 show coupler units for use in coupling together rod sections to form various configurations of the device, as may be required. The coupler unit of FIG. 17 has arms which extend out at right angles while the coupler unit of FIG. 18 has arms 109a and 109b which extend out at obtuse angles.

FIG. 19 illustrates how the elements of the second embodiment can typically be joined together to form one of many different configurations with the base 101 magnetically supported on a steel support structure 110. The vane structure 106 facilitates the actuation of the rods by wind from various directions to produce a rocking motion for magnets 105 as rods 20 move back and forth universally in any direction on sleeves 40. The variety of angles afforded by means of coupler units 108 and 109 enables an assembly of the device in different configurations as the situation may require.

While the invention has been described and illustrated in detail, it is to be clearly understood that this is intended by way of illustration and example only and is not to be taken by way of limitation, the scope of the invention being limited only by the terms of the following claims.

I claim:

1. A device mounted on a support structure for repelling birds comprising:

a support rod of non magnetic material;

a magnet mounted on said support rod;

means for mounting said support rod on said support structure; and resilient coupler means comprising an elastic sleeve having upper and lower apertures formed therein for connecting said support rod to said mounting means, said mounting means being fitted into said lower aperture, said support rod being fitted into said upper aperture;

whereby said support rod rocks back and forth in response to wind and other disturbances to generate a varying magnetic field which repels the birds.

2. The device of claim 1 and further including a second support rod connected to said first support rod, a magnet being mounted on said second support rod.

3. The device of claim 2 wherein the magnets of said first and second support rods are oriented normally to each other.

4. The device of claim 1 wherein said mounting means comprises a support base having at least one arm extending therefrom, said resilient coupler means being attached to said arm.

5. The device of claim 4 wherein said support base has a plurality of arms extending therefrom at different angles.

6. The device of claim 1 wherein said means for mounting said rod on said support structure comprises a flexible wire, said wire being wound around said structure.

7. A device mounted on a support structure for repelling birds comprising:

a base member having a plurality of arms extending therefrom in different directions;

a non magnetic support rod;

a resilient flexible sleeve for connecting said support rod to one of said arms, a magnet mounted on said support rod, and means for mounting said base member on said support structure, said rod rocking back and forth in response to wind or other forces such that said magnets generate a varying magnetic field which tends to repel birds.

8. The device of claim 7 and further including additional support rods connected to each of the other arms of said base member, a resilient flexible sleeve for connecting each of said support rods to a respective one of said arms, and a magnet mounted on each of said support rods.

9. The device of claim 7 and further including a second support rod, a magnet mounted on said second support rod, and means for connecting said second support rod to said first support rod.

10. The device of claim 9 wherein the magnet mounted on said second support rod is oriented normally to the magnet of said first support rod.

11. The device of claim 9 wherein said means for connecting said second support rod to said first support rod comprises a member having a plurality of arms extending in different directions, said second support rod being attached to a selected one of said arms.

12. The device of claim 7 and further including a vane member having normally oriented vanes mounted on the distal end of said support rod.

13. The device of claim 12 wherein said magnet is mounted directly beneath said vane member.

14. The device of claim 7 wherein said support structure is of magnetic material, said means for mounting said base member on said structure comprises a magnet attached to the bottom of said base member.

\* \* \* \* \*